United States Patent [19]

Tague, Jr. et al.

[11] Patent Number: 5,923,036
[45] Date of Patent: Jul. 13, 1999

[54] SPATIALLY-MULTIPLEXED IMAGING MICROSCOPE

[75] Inventors: Thomas J. Tague, Jr., Seymour, Conn.; Norman Mortensen, Caguas; Michael K. Bellamy, San German, both of Puerto Rico

[73] Assignee: Bruker Instruments, Inc., Billerica, Mass.

[21] Appl. No.: 08/797,713

[22] Filed: Feb. 11, 1997

[51] Int. Cl.[6] .................................................. G01N 21/35
[52] U.S. Cl. ............................ 250/339.07; 250/339.05; 250/341.1; 250/341.2; 250/350; 250/351; 250/353; 356/310
[58] Field of Search ......................... 250/339.05, 339.06, 250/339.07, 339.08, 341.1, 341.2, 350, 351, 353; 356/310, 330

[56] References Cited

U.S. PATENT DOCUMENTS

| | | | |
|---|---|---|---|
| 4,615,619 | 10/1986 | Fateley | 356/310 |
| 4,799,795 | 1/1989 | Fateley | 356/310 |
| 4,856,897 | 8/1989 | Fateley et al. | 356/310 X |
| 4,877,960 | 10/1989 | Messerschmidt et al. | 250/353 X |
| 5,579,105 | 11/1996 | Belton et al. | 356/310 |

*Primary Examiner*—Constantine Hannaher
*Attorney, Agent, or Firm*—Kudirka & Jobse, LLP

[57] ABSTRACT

An infrared imaging microscope uses spatial encoding to divide an sample being examined into a plurality of pixel regions. The spatial encoding is provided by a digitally controlled mask, which is preferably a multiple mirror array, and which masks the imaging radiation directed from a radiation source to the sample. The signal reflected or transmitted from the sample is detected using a single-element detector. As the mask pattern provided by the mask changes, the output signal of the detector is monitored, and the spectroscopic composition of each of the pixel regions is resolved using a spatial decoding method, such as a Hadamard transform. The digital control of the mask allows fast, easily-implemented changes to the masking pattern, and provides a low processing load relative to imaging devices that use multiple-element detectors. The invention may be implemented in a stand-alone microscope, or as a probe in which most of the elements of the device are located in a main housing, while the mask is located in a remote probe housing connected to the main housing by fiber optic cables. This allows reflective-mode scanning of free-standing objects. In one alternative embodiment, a multiple-element detector is used with the digitally-controlled mask. In this embodiment, visible light is spatially encoded by the mask along with the imaging radiation. By masking the visible light in this manner, visual examination of the sample allows correlation between the area of the sample being examined and the output of the appropriate element of the detector.

20 Claims, 5 Drawing Sheets

SPATIALLY-MULTIPLEXED IMAGING MICROSCOPE

BACKGROUND OF THE INVENTION

1. Field of the Invention

The present invention relates to imaging microscopes and, more particularly, to FT-IR (Fourier transform—infrared) imaging microscopes.

2. Description of the Related Art

When imaging a sample using a FTIR scanning microscope, it is commonplace to examine an image of the sample as an array of spatial regions. This division of the sampling region into individual elements, or "pixels", allows the analog signal for each pixel to be individually detected and converted to a digital signal. The entire area of the sample image is thereby digitized to produce a digital image which is more conducive to post-processing techniques. A conventional microscope accomplishes this breakdown of the sample into pixels with a raster-by-raster scan, examining each pixel region of the sample one at a time. For obvious reasons, this is a particularly lengthy process.

More recently, prior art systems have been making use of a multi-pixel detector array. The multi-pixel array has a grid of detection elements, each of which detects a different spatial region of the light passing through the sample. This allows for independent detection of different regions of an image. This removes the need to examine the pixels one at a time. However, in practice, the multi-pixel array suffers from a number of drawbacks.

For obtaining images of good quality resolution, it is necessary to use a sufficient number of pixels. For example, a typical imaging arrangement might use an array having pixel dimensions of 100×100, resulting in 10,000 individual pixels. Because of the complexity of these devices, they tend to be very expensive. For the same reason, they are also difficult to interface with other detection equipment. In addition, they tend to have a limited range of detection wavelengths, roughly 1000 $cm^{-1}$–3000 $cm^{-1}$, whereas the normal response in imaging experiments is 400 $cm^{-1}$–8000 $cm^{-1}$.

Perhaps the most notable disadvantage of multi-pixel detector arrays is the need to convert the analog signal of each pixel to a corresponding digital signal. Analog-to-digital (A/D) converters are generally limited to no more than 20 channels. Thus, for a detector having 10,000 pixels, 500 twenty-channel converters are required. Furthermore, each pixel is typically scanned a number (e.g. 100) of times, and the multiple scans are averaged together prior to digitizing so as to improve the signal-to-noise ratio. Thus, there is a significant amount of time required for the scanning of each pixel, and the overall experiment can last many hours.

A recent method of producing a digitized scan avoids many of the difficulties associated with the multi-pixel detector. This method is described in U.S. Pat. No. 4,615,619 to Fateley, and relies on a single-element detector, rather than a multi-pixel array. The division of the image into pixels is accomplished by an electrically-controllable mask. The mask uses a liquid crystal material arranged in pixel zones on the surface of the mask, the liquid crystal material being relatively transmissive when free of applied electrical current, but relatively opaque when a current is applied. In the mask, each zone is individually controllable to allow the liquid crystal material of a particular zone to be made transmissive or opaque as desired. The lack of complete opacity in the liquid crystal results in imperfect masking of the source radiation. However, the method of Fatelely device nonetheless enables pixel regions of the sample to be defined.

The Fateley method uses the mask to define the desired shape of the scanning area, and the size and shape of the pixels being used. The sample material is then illuminated with the desired IR radiation, and the resulting spectroscopic image of the sampled collected by the single element detector. Typically, a plurality of images are collected, representing the desired number of scans. These scans are subsequently averaged together to produce a single spectroscopic image of the sample which has a better signal-to-noise ratio than any single scan.

To resolve the signal components for the different pixels defined by the mask, the signal detected by the single element detector is processed with a Hadamard transform. The Hadamard transform is calculated using limits defined by the pixel locations on the mask, and effectively performs a spatial demultiplexing of the signal data of the individual pixels. The individual signal components obtained from the transform are thus representative, respectively, of the spectral composition of each separate region of the sample defined by the mask.

SUMMARY OF THE INVENTION

The present invention provides an infrared imaging apparatus which uses a single-element detector, and spatial demultiplexing of individual pixels of a detected image using a Hadamard transform. Unlike the prior art, however, the present invention employs a digitally controlled mask for performing the spatial multiplexing of the different pixel regions of the sample image. The mask comprises an array of mirrors, each of which is independently controllable to reflect IR radiation toward or away from a sample being examined. The mirrors of the mirror array are in this way adjusted to form a pixel mask, the masked (i.e. blocked) pixels being created by those mirrors which reflect light away from sample. Those mirrors which direct light toward the sample illuminate selected regions of the sample, the spatial positions of which correspond to the spatial positions of the reflecting mirrors.

One embodiment of the present invention is a microscope which may function in either a transmissive or a reflective mode. In either case, the IR radiation transmitted through, or reflected from, the sample is indicative of the wavelengths of radiation which were absorbed by the sample. As the masking pattern defined by the mirror array is changed by changing those mirrors of the array which are directing light toward the sample, the spectral content of the IR signal reaching the single-element detector may also change, since different portions of the sample being illuminated may contain materials which have different spectrally absorptive properties.

To perform the desired spatial multiplexing/demultiplexing of the IR signal, a predetermined sequence of different masking patterns is used over time. The detector output is collected during the entire time that the masking pattern is changed. This data is then spatially demultiplexed using a mathematical method such as a Hadamard transform, which applies the limits of the different pixel regions relative to the predetermined changes in the masking pattern to generate the signal contributions of each of the pixel regions.

In an alternative embodiment, the imaging apparatus may make use of a remote probe connecting to a base unit by fiber optic cable. The probe may be arranged to operate in transmissive mode, or can be used in reflective mode. For example, the probe can be made small so that it may be held in a user's hand, and can be used to examine the surface of three dimensional samples to large to allow for transmissive mode operation. In particular, the probe can be used as a medical scanner for imaging the tissue of a patient in vivo. The reflectance spectrum provides an indication of the contents of the tissue sample, and can be quickly analyzed using the combination of the multiple mirror array mask and the above-mentioned Hadamard transform techniques.

In yet another alternative embodiment of the invention, the digitally controlled mask is used in conjunction with a multiple-element detection array. Rather than using the mask for the spatial multiplexing of the imaging radiation, this embodiment relies on the mask to allow correlation between the appropriate output signals of the detector and a visual examination of the sample. The mask is used to spatially encode the visible light being directed to the sample. By correlating this encoding with the detection elements of the detector, the portion of a sample responsible for the spectroscopic signal output by a particular detection element can be pinpointed.

DETAILED DESCRIPTION OF THE PREFERRED EMBODIMENTS

Figure 1:
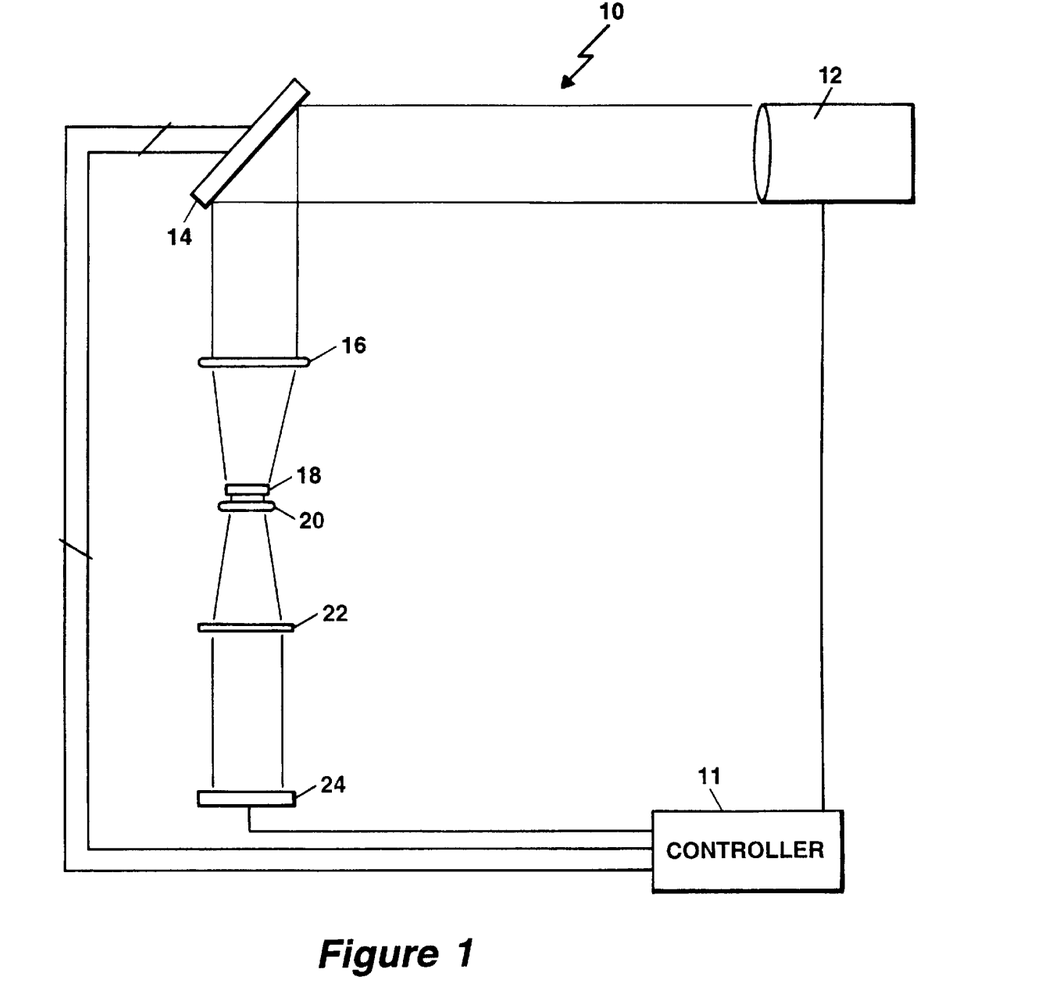
FIG. 1 is a schematic view of an infrared imaging apparatus according to the present invention.

Depicted schematically in FIG. 1 are the primary components for an imaging device 10 according to the present invention. An infrared light source 12 directs a beam of highly collimated light having the desired infrared wavelengths toward mask 14. In the preferred embodiment, the light source is capable of generating light in both the near-infrared and mid-infrared spectrum. However, the invention is not limited by the wavelengths of light used. As shown, a signal connection is provided between light source 12 and controller 11, which may be used to control operation of the light source.

Mask 14 is used to break the light incident upon it into independent spatial regions. That is, the mask is used to selectively mask certain regions of the light from light source 12. In the preferred embodiment, the mask 14 is a digital mirror array having a plurality of mirrors, each of which is independently tiltable about a single axis.

The independent mirrors of the mask 14 break the light into a plurality of separate regions, commonly referred to as "pixels". By positioning some of the mirrors such that they reflect light toward a sample being examined, while the other segments are positioned to reflect away from the sample, the desired masking effect is achieved. Mask 14 is discussed in further detail below.

As shown in FIG. 1, prior to illumination of the sample 18, the light reflected from mask 14 is passed through condensing optics, which in this embodiment is focusing lens 16. The lens 16 concentrates the light onto the surface of the sample 18. Focusing of the light increases its intensity per unit area, thus boosting the signal power and improving the signal-to-noise ratio of the imaging system. Any desired magnification (or none at all) may be used with the present invention. However, in the preferred embodiment, the lens 16 provides magnification of approximately fifteen-to-one.

Light focused by lens 16 illuminates sample 18, which is mounted on a sample stage of conventional design. The light passing through the sample is spectrally resolved in that certain wavelengths are absorbed depending on the material present in the sample. That is, different regions of the sample may have a different composition, and may correspondingly produce a different absorption spectrum. Thus, as is well-known in the art, the light exiting the sample has a spatial distribution of spectral components indicative of the spatial distribution of spectrally absorptive materials in the sample.

Prior to detection, the light exiting sample 18 is expanded back to its original cross-sectional area with defocusing lens 20, and collimated using collimating lens 22. As mentioned previously, neither focusing nor defocusing is required to practice the invention, but is preferred to enhance the signal-to-noise ratio. From the collimating lens 22, the light is directed to detector 24. Detector 24 is a single element detector which responds to the light received from collimating lens 22 by generating a single analog output signal indicative of the intensity of the received light across all detectable wavelengths. As the mirrors of the mask 14 are moved to change the arrangement of segments which direct light toward the sample, and those which direct light away from the sample, the output signal of the detector changes accordingly. By changing the masking pattern of the mask 14 in a predetermined way, Hadamard transform techniques can be used to localize the spectral contributions of light passing through each of a number of different spatial regions of the sample. Those skilled in the art will recognize that the apparatus disclosed herein may also be used without the Hadamard transform techniques to record individual spectra, such as the spectrum of the entire sample, with little or no signal loss.

Figure 2:
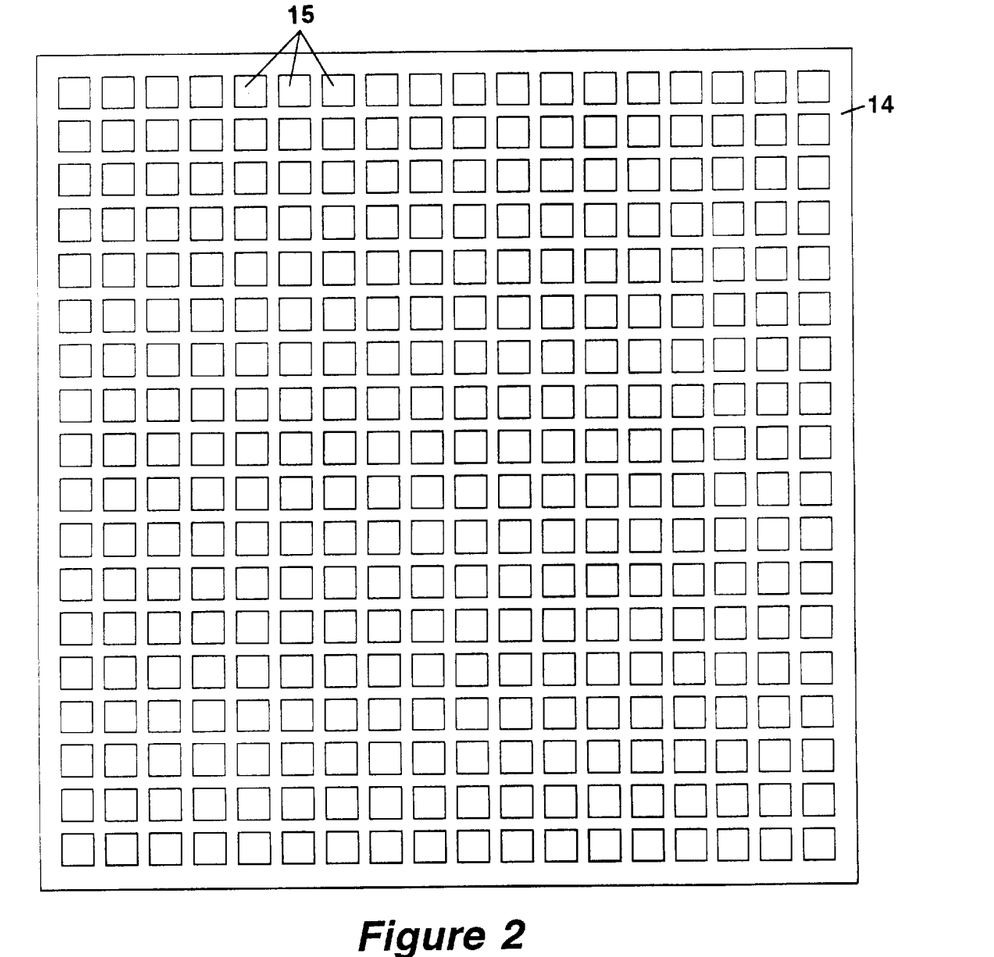
FIG. 2 is a front view of a multiple mirror array for use with an imaging apparatus according to the present invention.

FIG. 2 is a front view of the mask 14 of the preferred embodiment of the invention. The mask 14 has an array of mirrors 15 each of which is independently tiltable about a single axis. For ease of description, the array shown in FIG. 2 has only 100 independent mirrors. However, those skilled in the art will understand that the mask may actually have many more independent mirrors in order to provide the desired resolution. A commercially-available mirror array may be used for mask 14. In the preferred embodiment, the array may be one similar to the Digital Micromirror Device (DMD), manufactured by Texas Instruments Corporation.

If the DMD is selected for the mirror array, one modification is necessary to allow its use with the present invention. Since the DMD is intended for use with light in the visible spectrum, it has a glass cover protecting the mirrors. It is necessary to remove the glass cover and replace it with one which is transparent to IR radiation. Furthermore, this modification should be performed in a clean room to avoid contamination of the mirror array.

A typical DMD has array dimensions 848×600, that is, a total of 508,800 independent mirrors, each being square, 16 $\mu$m on each side. The mirrors are set on hinges atop a static random access memory (SRAM). Each of the mirrors 15 is tiltable between two positions, 10° in each of two different directions from a center, neutral position. Each mirror is electrostatically controlled to move it between its two positions. Moreover, the DMD controls the mirrors 15 with digital signals, one memory location of the SRAM being associated with each mirror. The memory cell at each location can be set to either a logic high (i.e., a binary "1"), or a logic low (i.e., a binary "0"). If the bit for a particular mirror is set to a logic high, the mirror 15 is moved by the corresponding voltage to a first position, and if the bit is set to a logic low, the mirror is moved by the corresponding voltage to a second position. Thus, by toggling the control bit for a particular mirror, the segment may be alternated between its two active positions.

To create a desired mask pattern, a logic high is written into each of the memory locations which controls a mirror 15 corresponding to a pixel for which light is to be directed to the sample. This orients each of these mirrors to a position which redirects light from the IR source 12 to the focusing lens 16. Correspondingly, a logic low is written into each of the memory locations which controls a mirror 15 corresponding to a pixel for which light is not to be transmitted through the sample. This orients each of these mirrors to a position which redirects light from the IR source 12 away from the focusing lens 16. Thus, a particular digital signal sets the mask to a desired mask pattern. A different digital signal likewise sets the mask to a different mask pattern.

The modification of the masking pattern can serve a number of different purposes. For example, depending on the size and shape of the sample, and/or the area of the sample that one wishes to examine, the masking pattern can be arranged to only include those (active) mirrors 15 which reflect light through the desired sample area. The other (inactive) mirrors of the DMD remain in the neutral position (approximately halfway between the two tiltable positions) and do not direct light incident upon them toward the sample. Since there is no need to control these other mirrors, the digital processing load is reduced.

Modification of the masking pattern is also used to provide the spatial multiplexing of the detected signal, which allows the signal in the different pixel regions to be distinguished. This is accomplished by changing, for each of a plurality of different detection periods, which of the different active mirrors are positioned to direct the radiation toward the sample, and which are positioned to direct the radiation away from the sample. For each of the detection periods, the output signal from the detector 24 is recorded. Once the output signals of the detector are recorded for each of the different masking patterns, Hadamard transform techniques are used to demultiplex the output and determine the spectral contribution of each of the different pixels (i.e. the spectrum of each of the different regions of the sample).

There are many different series of masking patterns which can be used to perform the spatial multiplexing/demultiplexing of the detected signal. One preferred masking method uses a progression of masking patterns for masking an array of n pixels. Each of the masks of the masking progression has $\frac{1}{2}(n+1)$ pixels which pass radiation through the sample, and $\frac{1}{2}(n-1)$ pixels which direct radiation away from the sample. For example, if the mask was to use an array of 15×17 pixels, there would be a total of 255 pixels and, using a masking method like that described above, 128 of the pixels would be "on" (i.e. 128 of the mirrors would direct radiation through their respective region of the sample) and 127 of the pixels would be "off" (i.e., 127 of the mirrors would direct radiation away from the sample).

For the 255 pixels in the above example, 255 IR spectra must be collected (i.e. 255 different detector output signals, each produced using a different masking pattern). Each of the spectra can be treated as one of 255 different equations (the differences being created by the effect of the different masking patterns). Using the 255 equations, one must solve for 255 unknowns, those being the 255 IR spectra attributable to the 255 different pixel regions of the sample. Solving for these unknowns may be accomplished by rearranging the regular FT-IR spectra and performing a fast Hadamard transform on the data.

When using the present invention for chemical imaging, a Hadamard matrix is used to encode the micromirrors. In such a matrix, a "1" corresponds to a given pixel being on, while a "0" corresponds to a given pixel being off. For imaging an area of, for example, 1 cm×1 cm using a 255 pixel array, the DMD may be used as a cyclic S-255 element matrix may be used to collect the 255 IR spectra. However, the number of micromirrors used to designate the "on" or "off" state of the Hadamard matrix determines the physical area of the sample to which each spectrum corresponds. For example, one could designate that a group of 39×39 micromirrors together make up one "pixel" (or perhaps "macropixel"), such that they are tilted together from one position to another. Thus, (if the image of the micromirrors is not condensed at all) the "pixel" would have an area of: 17 $\mu$m per micromirror×39 mirrors, or 663 $\mu$m×663 $\mu$m. Obviously, the same aggregation of mirrors per pixel could be done for each of the other sampling areas as well.

From the above example it will be clear that changing the number of micromirrors which corresponds to an element in the Hadamard matrix allows one to change the sampling area. This versatility of combining mirrors to form single pixels allows for imaging at different resolutions. Furthermore, the DMD allows for the resolution to be changed simply by changing the digital codes controlling the micromirrors. With appropriate control software, such a change in resolution can be simply a matter of entering commands to the controller 11 of the imaging system. One may specify different resolutions for imaging the same sample, image with one resolution in a first area of the sample while using a different resolution in another area, or perform any of a wide variety of different desired constructions.

Figure 3:
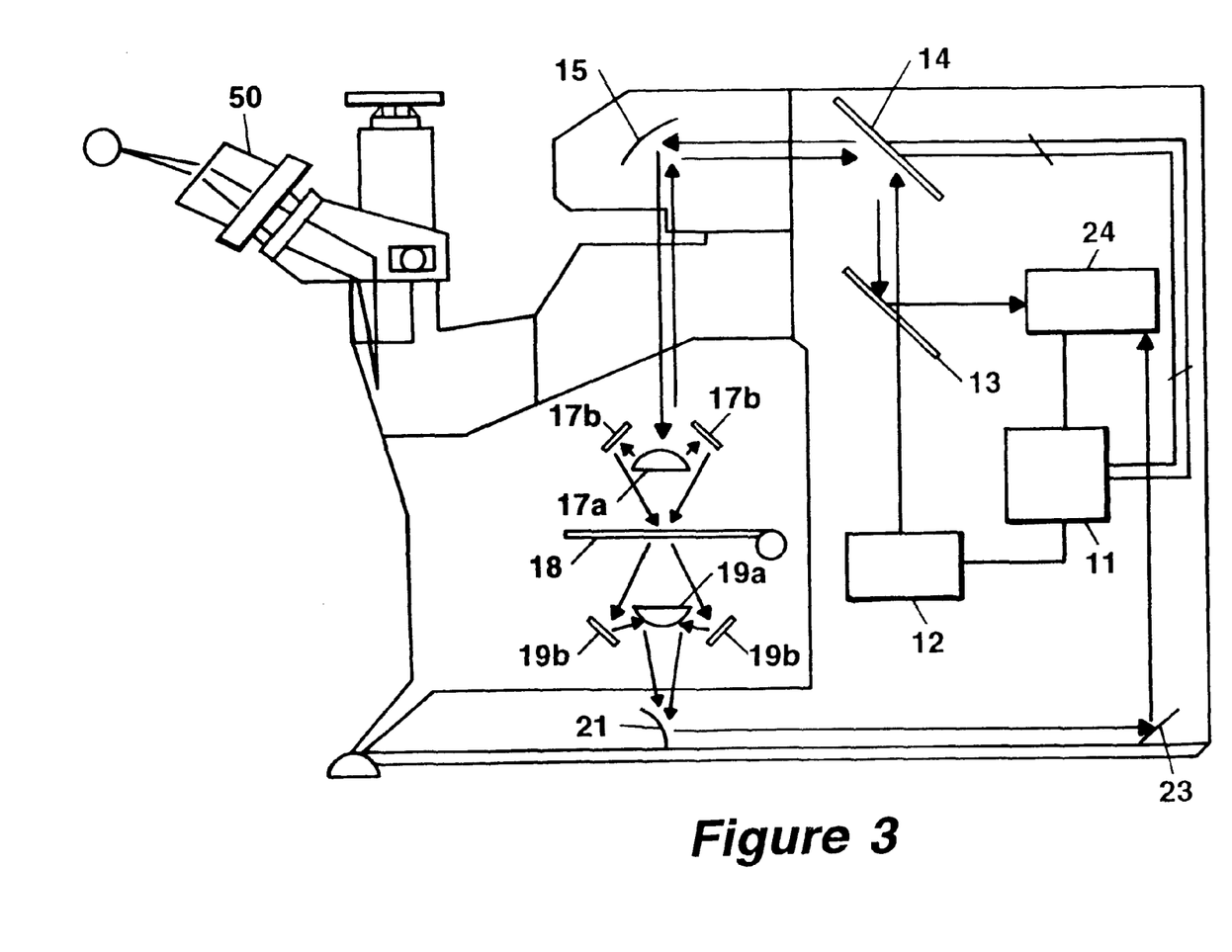
FIG. 3 is a schematic view of an infrared imaging microscope according to the present invention.

One preferred embodiment of the present invention is shown in FIG. 3, which depicts an IR microscope. An IR source 12 supplies a beam of infrared light which is directed to mask 14, passing through optical element 13. Optical element 13 is a movable element which, in one position used for transmissive mode analysis, is transparent to the IR radiation, and which, in a second position used for reflective mode analysis, is a beamsplitter. Such optical elements are known in the art for allowing a microscope to be used in both the transmissive and the reflective modes.

The mask 14 is a multiple mirror array which redirects selected portions of the IR beam toward concave mirror 15, which reflects it toward condensing optics 17a, 17b. Unlike the single lens 16 of FIG. 1, the condensing optics in this embodiment consists of hemispherical mirror 17a and mirrors 17b, which are arranged as a conventional Schwartzchild objective. Those skilled in the art will recognize that the mirrors 17a, 17b perform the same function as the single condensing lens 16 of FIG. 1. The focused IR light is incident upon sample 18, which absorbs different wavelengths of the light, as described above. When the microscope is operated in transmissive mode, the radiation passing through the sample is expanded back to its original beam area by expanding optics 19a, 19b (a symmetrical arrangement to mirrors 17a, 17b), and collimated by convex mirror 21, which is the optical inverse of mirror 15. The light is once again reflected, this time by mirror 23, which directs it toward IR detector 24, which is a single element detector as described above in conjunction with FIG. 1. The detected signal is processed by controller 11, which also controls IR source 12 and mask 14 in the manner described above with regard to FIG. 1.

When the microscope of FIG. 3 is operated in reflective mode, light is reflected from the sample back toward optics 17a, 17b, where it is expanded back to its original beam area. After reflecting off mirror 15, the reflected signal returns to mask 14, where it is redirected toward optical element 13, which is positioned to provide a beamsplitter. The optics of the system are arranged such that the spatial orientation of the light returning to mask 14 is the same as that which was originally reflected off mask 14. Thus, the pixel arrangement provided by the mask 14 is maintained, as the different spatial portions of the light beam return to the same regions of mask 14 from which they were originally reflected. The light reaching beamsplitter 13 is there partially reflected toward detector 24, which processes the IR signal in the same manner as described above for the transmissive mode.

Also provided in the embodiment of FIG. 3 is a viewing port 50 for visually examining the sample. The visible light source and associated optical elements necessary for providing a visible image to the viewing port 50 are well known in the art, and are therefore not shown in FIG. 3.

Figure 4:
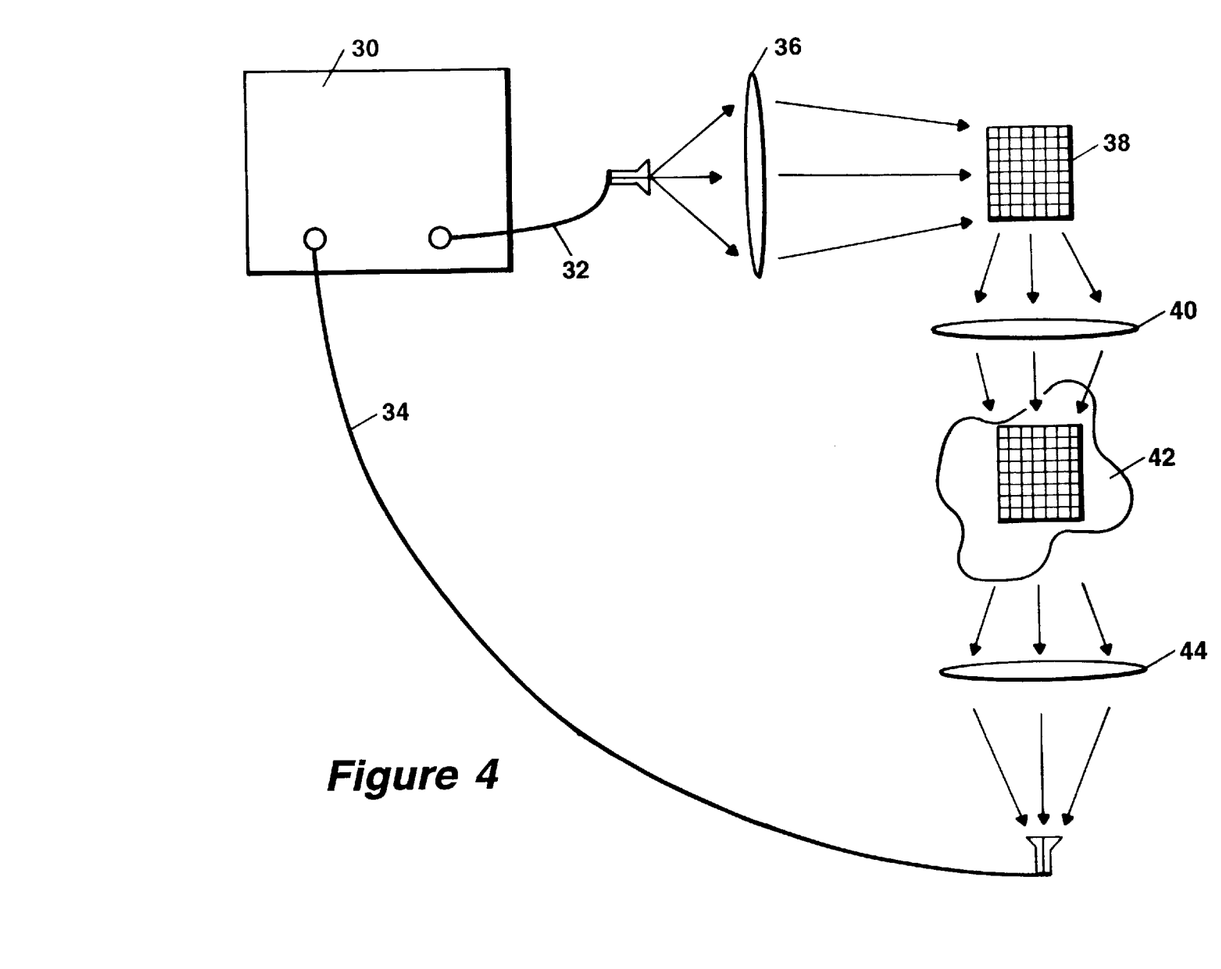
FIG. 4 is a schematic view of an infrared imaging apparatus according to the present invention which has a sampling probe external to a main spectrometer portion.

In addition to the microscope of FIG. 3, the present invention may also be applied in other configurations. For example, shown in FIG. 4 is a schematic diagram of an IR imaging probe which operates according to the present invention. The probe is used with a spectrometer 30 of known design, which has a fiber optic module and is linked to the probe by fiber optic cables 32, 34. The two fiber optic cables allow the spectrometer to output an IR signal to be used for sampling, and to receive a return signal having the desired spectroscopic information.

An IR signal is output from spectrometer 30 along fiber optic cable 32. This signal is then directed onto focusing lens 36, where it is focused onto mirror array 38. As in the example of FIG. 1, the mirror array is preferably a digitally controllable mirror array, such as the DMD by Texas Instruments, Inc, which has been modified for use with IR wavelengths. The mirrors of the mirror array 38 are arranged to provide a desired masking pattern by positioning select mirrors to reflect light toward focusing lens 40, while positioning others to reflect light away from focusing lens 40. In this way, the sample 42 is broken down into pixels, some illuminated by light reflected from a corresponding mirror in the array, and others not illuminated, if their corresponding mirror directs light away from the sample.

As shown, the masked IR radiation from the mirror array 38 is focused onto the sample 42 by focusing lens 40. The probe may be operated in transmissive mode, in which the sample 42 is located in a space provided between lenses 40, 44, and light transmitted In one preferred embodiment, the probe of FIG. 4 operates as a diffuse reflectance at-line imager. That is, rather than operating in a transmissive mode (as is available with the arrangement of FIG. 3), the probe of FIG. 4 relies solely on the detection of a reflected IR signal from the sample under examination. As with the radiation transmitted through the sample in a transmissive mode, the reflected radiation from the sample in FIG. 4 has specific spectral absorption characteristics. Different regions (i.e. different pixels) of the masked IR radiation undergo different spectroscopic wavelength absorption relative to the material in the different corresponding regions of the sample illuminated by the radiation from lens 40. Thus, the radiation output from the sample is indicative of the spectral absorption characteristics of the sample in each of the illuminated regions.

The IR signal reflected from the sample 42 is focused into fiber optic cable 34 by focusing lens 44. The signal is transmitted along the cable 34 to the spectrometer, within which is a single element detector (not shown). As the masking patterns provided by the mirror array 38 are changed in accordance with a desired sequence, the regions of the sample from which the radiation is reflected are correspondingly changed. This, in turn, changes the IR radiation signal coupled into the fiber optic cable 34. The analog signal detected by the detector within spectrometer 30 is recorded over time. Once the data for all the masking patterns of the sequence is collected, Hadamard transform techniques (as discussed in conjunction with FIG. 1) are used to spatially demultiplex the signal, and ascertain the signal content for each of the pixels created by the masking. As these pixels correspond to different spatial regions of the sample, the corresponding absorption spectra for each of these spatial regions are thereby obtained.

The fiber coupling between the probe and spectrometer of FIG. 3 allows manual manipulation of the probe relative to a material to be sampled. In particular, the use of a reflectance spectrum allows for the imaging of free-standing objects. For example, the probe could be used for the imaging of human skin in-vivo, perhaps for the mapping of cancerous cells. With the spatial multiplexing provided by the invention, a physician operating the probe could examine a patient's skin, and determine not only if cancerous cells existed, but what area of skin would need to be removed to remove those cells. Many other uses for the probe will be apparent to those skilled in the art.

In one variation of the present invention, the multiple mirror mask 14 is used in a probe embodiment in conjunction with a multi-pixel detector. As shown schematically in FIG. 5, a probe housing 50 contains a light source 52 for generating the radiation necessary for the desired spectroscopic analysis. In the preferred embodiment, this light source 52 is a near infrared, or a Raman source. The light from light source 52 is directed out of the probe housing, and is incident upon sample 54. Light reflected from the sample 54 therefore contains the desired spectroscopic information due to absorption of certain wavelengths by the sample material.

Figure 5:
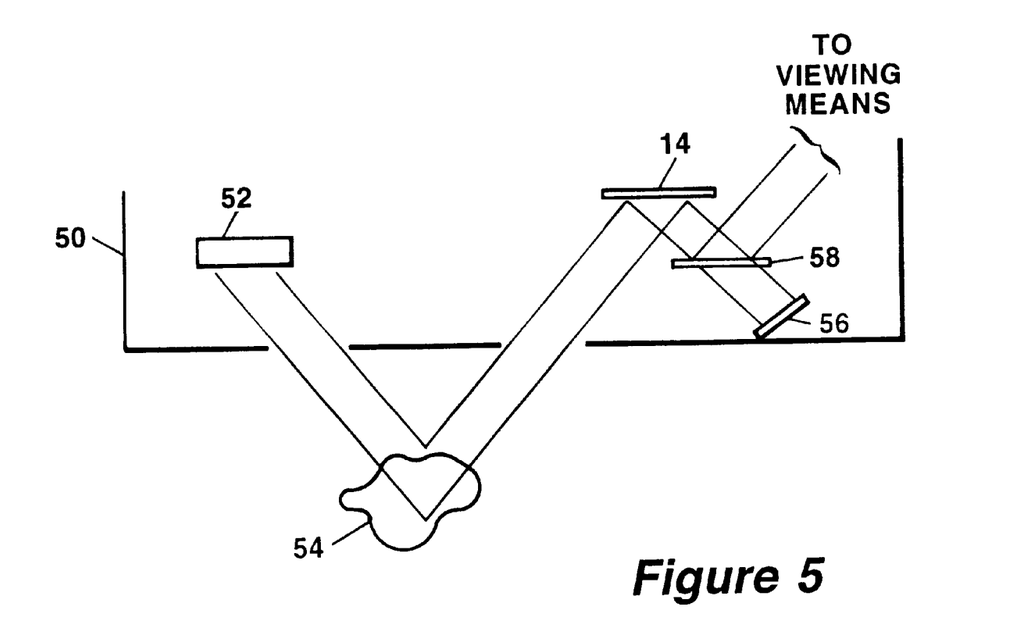
FIG. 5 is a schematic view of an alternative embodiment in which a multiple-element detector is used with the digitally controlled mask to allow correlation between a visual examination of the sample and the appropriate output signal.

Unlike the previous embodiments, the embodiment of FIG. 5 makes use of multi-pixel detector 56. Preferably, this detector is a charge-coupled device (CCD) array, as is known in the art. The mask 14 is a multiple mirror array, such as a DMD, and is positioned such that it receives light reflected from the sample 54, and redirects it toward detector 56. Since the detector 56 is a multi-pixel detector, it is not necessary that the mask 14 be used for spatially encoding the light signal from the sample, as in the previous embodiments. However, the mask 14 is used to visually pinpoint portions of the sample being examined. This use is explained more fully below.

If, in the embodiment of FIG. 5, a flat mirror was used in place of mask 14, examination of a free-standing object (such as human skin in-vivo) would be possible but, if one wanted to view the area being examined, correlation between the region of the sample being examined and the region of the sample being viewed would be difficult or impossible. This is because there is no fixed point of reference between the pixels of the detector and the regions of the sample being illuminated. For example, if one of the detector elements was outputting a signal which indicated a particular sample content, one viewing the sample would not be able to determine which portion of the sample being illuminated was responsible for that signal output.

In the embodiment of FIG. 5, the mask 14 is used to allow correlation between the visual signal and the detected signal. A conventional viewing means, such as an eyepiece or video camera, is used to examine light being reflected from the sample. If the light being used for detection is in the visible range, light source 52 may generate only that range of wavelengths. However, if the light used for detection is invisible for the purposes of viewing, light source 52 may also generate visible light in addition to the light used for detection. To direct visible light reflected from the mask 14 to the viewing means, a beamsplitter 58 of conventional design is located in the path between mask 14 and detector 56. The beamsplitter 58 partially reflects the optical signal from the mask 14 to the viewing means. If the detection wavelengths are different than the viewing wavelengths, the beamsplitter 58 may also have some filtering characteristic, such that it primarily reflects visible wavelengths and primarily transmits invisible wavelengths.

By changing the masking pattern on the mask 14 while viewing the sample with the viewing means, a user may correlate between the visually observed portion of the sample and the portion of the sample responsible for the detected output signal. For example, if a given spectrum was detected by a particular pixel (or group of pixels) of detector 56, the mask could then be adjusted to reflect only that light (visible as well as invisible) which corresponded to that region of the detection array. This would then allow pinpointing of the region of the sample responsible for the spectrum of interest.

While the present invention has been shown and described with regard to a preferred embodiment thereof, it will be recognized by those skilled in the art that various change in form and detail may be made herein without departing from the spirit and scope of the invention as defined by the appended claims.

What is claimed is:

1. An imaging apparatus for providing spectroscopic imaging of a sample, the apparatus comprising:

a source of electromagnetic imaging radiation;

a digitally-controllable mask for spatially encoding the radiation from the radiation source, the mask comprising a multiple mirror array having a plurality of pixel elements which are each independently controllable in response to digital voltage signals applied directly to the mask, spatially encoded radiation from the mask being directed to the sample;

a detector for detecting a spectroscopic signal comprising radiation directed from the sample to the detector and outputting a detection signal in response thereto; and a controller for controlling the application of said digital voltage signals to the mask.

2. An imaging apparatus according to claim 1 wherein the radiation source is an infrared radiation source.

3. An imaging apparatus according to claim 1 wherein the detector has a single detection element.

4. An imaging apparatus according to claim 1 wherein the detector detects radiation transmitted through the sample.

5. An imaging apparatus according to claim 1 wherein the detector detects radiation reflected from the sample.

6. An imaging apparatus according to claim 1 wherein the imaging apparatus comprises an imaging microscope.

7. An imaging apparatus according to claim 1 wherein the imaging apparatus comprises:

a main housing in which the radiation source, the detector and the controller are located; and a remote probe in which the mask is located and which is manually manipulable relative to the sample.

8. An imaging apparatus according to claim 1 wherein the pixel elements of the mask are individual mirror segments of the mirror array, and wherein each of the mirror segments is electrostatically controlled between at least two positions by the application of one of two digital logic signals to an electrode of that mirror segment.

9. An imaging apparatus according to claim 1 wherein the detector is a multiple-element detector, each element of which outputs an independent signal indicative of spectroscopic content of radiation detected by that detector.

10. An imaging apparatus for providing spectroscopic imaging of a sample, the apparatus comprising:

a source of electromagnetic imaging radiation;

a digitally-controllable mask for spatially encoding the radiation from the radiation source, the mask having a plurality of pixel elements which are each independently controllable in response to digital voltage signals applied directly to the mask, spatially encoded radiation from the mask being directed to the sample;

a detector for detecting a spectroscopic signal comprising radiation directed from the sample to the detector and outputting a detection signal in response thereto;

a controller for controlling the application of said digital voltage signals to the mask;

a main housing in which the radiation source, the detector and the controller are located; and a remote probe in which the mask is located and which is manually manipulable relative to the sample.

11. An imaging apparatus for providing spectroscopic imaging of a sample, the apparatus comprising:

a source of electromagnetic imaging radiation;

a digitally-controllable mask for spatially encoding the radiation from the radiation source and directing it to the sample, the mask comprising a multiple mirror array having a plurality of electrostatically-controlled multiple mirror segments each of which is electrostatically controlled between at least two positions by the application of one of at least two digital logic signals to an electrode of that mirror segment;

a detector having a single detection element for detecting a spectroscopic signal comprising radiation directed from the sample to the detector and outputting an electrical signal in response thereto; and a controller for controlling the application of said digital voltage signals to the mask.

12. A method of spectroscopically imaging a sample, the method comprising:

providing a source of electromagnetic imaging radiation;

spatially encoding the radiation from the radiation source using a digitally-controllable mask comprising a multiple mirror array having a plurality of pixel elements each of which are independently controllable in response to digital voltage signals applied directly to the mask;

directing spatially encoded radiation from the mask to the sample;

detecting radiation from the sample and outputting a detection signal in response thereto; and controlling the spatial encoding of the radiation from the radiation source by controlling said digital voltage signals applied to the mask such as to create a series of different masking patterns with the pixel elements of the mask while simultaneously monitoring the detection signal.

13. A method according to claim 12 wherein providing a source of imaging radiation comprises providing a source of imaging radiation which is infrared radiation.

14. A method according to claim 12 wherein detecting radiation from the sample comprises detecting radiation with a single-element detector.

15. A method according to claim 12 further comprising:

locating the radiation source and detector in a main housing; and locating the mask in a remote probe which is manually manipulable relative to the sample.

16. A method according to claim 15 wherein the sample is part of a free-standing object, and the method further comprises changing the sample by moving the probe manually relative to said object.

17. A method according to claim 12 wherein detecting radiation from the sample comprises detecting radiation from the sample with a multiple element detector.

18. A method according to claim 17 further comprising:

providing a source of visible light;

masking the visible light with the mask such that the visible light and the imaging radiation have the same spatial encoding;

directing visible light from the mask to the sample; and viewing the visible light incident on the sample.

19. A method of spectroscopically imaging a sample, the method comprising:

providing a source of electromagnetic imaging radiation located within a main housing;

spatially encoding the radiation from the radiation source using a digitally-controllable mask having a plurality of pixel elements each of which are independently controllable in response to digital voltage signals applied directly to the mask, the mask being located in a remote probe that is manually manipulable relative to the sample;

directing spatially encoded radiation from the mask to the sample;

detecting radiation from the sample with a detector located within the main housing and outputting a detection signal in response thereto; and controlling the spatial encoding of the radiation from the radiation source by controlling said digital voltage signals applied to the mask such as to create a series of different masking patterns with the pixel elements of the mask while simultaneously monitoring the detection signal.

20. A method of spectroscopically imaging a sample, the method comprising:

providing a source of electromagnetic imaging radiation;

spatially encoding the radiation from the radiation source using a digitally-controllable mask having a plurality of pixel elements each of which are independently controllable in response to digital voltage signals applied directly to the mask;

directing spatially encoded radiation from the mask to the sample;

detecting radiation from the sample and outputting a detection signal in response thereto;

providing a source of visible light;

masking the visible light with the mask such that the visible light and the imaging radiation have the same spatial encoding;

directing visible light from the mask to the sample;

viewing the visible light incident on the sample; and controlling the spatial encoding of the radiation from the radiation source by controlling said digital voltage signals applied to the mask such as to create a series of different masking patterns with the pixel elements of the mask while simultaneously monitoring the detection signal.

* * * * *